United States Patent [19]

Hashimoto et al.

[11] 4,220,748
[45] Sep. 2, 1980

[54] ROOM TEMPERATURE CURABLE POLYSILOXANE COMPOSITION

[75] Inventors: Mitsuyoshi Hashimoto, Ojima; Kiyoshi Hosokawa; Bunjirou Murai, both of Ohta, all of Japan

[73] Assignee: Toshiba Silicone Co., Ltd., Tokyo, Japan

[21] Appl. No.: 22,119

[22] Filed: Mar. 20, 1979

[30] Foreign Application Priority Data

Mar. 30, 1978 [JP] Japan .................................. 53-36982

[51] Int. Cl.$^2$ ............................................. C08G 77/06
[52] U.S. Cl. ..................................... 528/18; 260/18 S; 260/37 SB; 528/11; 528/32; 528/33; 528/34; 528/38; 528/901
[58] Field of Search ...................... 528/33, 34, 901, 11, 528/32, 38, 18, 43; 260/18 SI, 37 SB

[56] References Cited

U.S. PATENT DOCUMENTS

| | | | |
|---|---|---|---|
| 3,661,817 | 5/1972 | Hamilton et al. | 528/33 |
| 3,766,127 | 10/1973 | Clark et al. | 528/901 |
| 3,816,359 | 6/1974 | Creames | 528/901 |

*Primary Examiner*—Melvyn I. Marquis
*Attorney, Agent, or Firm*—Blanchard, Flynn, Thiel, Boutell & Tanis

[57] ABSTRACT

A room temperature curable polyorganosiloxane composition comprising (A) 100 parts by weight of a silanol-terminated polydiorganosiloxane having a viscosity of 500 to 200,000 cSt measured at 25° C., (B) 0.5 to 25 parts by weight of an acetoxy group-containing organic silicon compound selected from the group consisting of acetoxy group-containing silanes represented by the following formula and partially hydrolyzed products thereof:

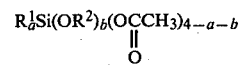

wherein $R^1$ stands for a monovalent substituted or unsubstituted hydrocarbon group, $R^2$ is a monovalent group selected from the group consisting of alkyl groups and alkoxyalkyl groups, a is a number of 0 or 1, and b is a number of 0 or 1, and (C) 0.01 to 10 parts by weight of the reaction product of the reaction between (1) an aminoalkyl group-containing organic silicon compound selected from the group consisting of aminoalkyl group-containing silanes represented by the following formula and partially hydrolyzed products thereof:

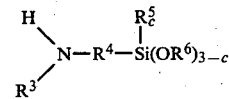

wherein $R^3$ stands for a hydrogen atom or a monovalent substituted or unsubstituted hydrocarbon group, $R^4$ stands for a divalent hydrocarbon group, $R^5$ stands for a monovalent substituted or unsubstituted hydrocarbon group, $R^6$ is a monovalent group selected from the group consisting of alkyl groups and alkoxyalkyl groups, and c is a number of 0 or 1, and (2) an anhydride of a polybasic acid.

17 Claims, No Drawings

ROOM TEMPERATURE CURABLE POLYSILOXANE COMPOSITION

The present invention relates to a room temperature curable polyorganosiloxane composition (RTV silicone) which can be stored in a stable state for a long period of time in the absence of moisture and which can be cured to form a rubbery elastomer by contact with moisture. More particularly, the invention relates to a one-pack type room temperature curable polyorganosiloxane composition which releases acetic acid during curing and which adheres tightly to various materials.

One-pack type room temperature curable polysiloxane compositions which can be stored in a stable state for a long time in the moisture-free condition and which can be cured to a rubbery elastomers by contact with moisture while releasing acetic acid are known, and these compositions are used as sealing materials for construction and industrial purposes. As the cross-linking agent for room temperature curable polysiloxane compositions of this type, methyltriacetoxysilane is preferred because it is inexpensive and effectively used. However, because the melting point of this cross-linking agent is higher than room temperature, it is easily crystallized during storage of the one-pack type room temperature curable polysiloxane composition, and therefore, the composition is not suitable for actual applications. As means for preventing crystallization of methyltriacetoxysilane, there are known (1) a method in which a partially hydrolyzed product of methyltriacetoxysilane is used, (2) a method in which a compound which is hardly crystallized at room temperature, such as dibutoxydiacetoxysilane, is used in combination with methyltriacetoxysilane, and (3) a method in which a partially alkoxylated acetoxysilane is used. Deacetylation-type one-pack type room temperature curable polysiloxane compositions prepared according to these known methods can be satisfactorily used as adhesive sealing materials for glass, porcelain materials and aluminum. However, when they are applied to various metals such as stainless steels and other steels and plastic materials, the adhesion is poor not only in the normal state but also after immersion in water. Accordingly, in order to obtain a durable bonding while overcoming this defect, it is necessary to use a primer for improving the adhesiveness. However, when the foregoing polysiloxane compositions are used in combination with such primers, the application fields are inevitably limited because disadvantages are brought about in some application fields by the use of such primers.

It is therefore a primary object of the present invention to overcome the foregoing defects of the conventional techniques and to provide a deacetylation-type room temperature curable polysiloxane composition which exhibits good adhesiveness to glass, porcelain materials and aluminum and adheres tightly to various metals and plastics, even in the absence of a primer.

More specifically, in accordance with the present invention, there is provided a room temperature curable polysiloxane composition which possesses excellent adhesion properties, and which consists essentially of (A) 100 parts by weight of a silanol-terminated polydiorganosiloxane having a viscosity of 500 to 200,000 cSt measured at 25° C., (B) 0.5 to 25 parts by weight of an acetoxy group-containing organic silicon compound selected from the group consisting of acetoxy group-containing silanes represented by the following formula and partially hydrolyzed products thereof:

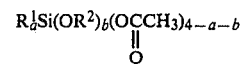

wherein $R^1$ stands for a monovalent substituted or unsubstituted hydrocarbon group, $R^2$ is a monovalent group selected from the group consisting of alkyl groups and alkoxyalkyl groups, a is a number of 0 or 1, and b is a number of 0 or 1,
and (C) 0.01 to 10 parts by weight of the reaction product of the reaction between (1) an aminoalkyl group-containing organic silicon compound selected from the group consisting of aminoalkyl group-containing silanes represented by the following formula and partially hydrolyzed products thereof:

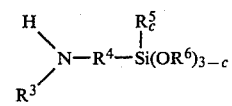

wherein $R^3$ stands for a hydrogen atom or a monovalent substituted or unsubstituted hydrocarbon group, $R^4$ stands for a divalent hydrocarbon group, $R^5$ stands for a monovalent substituted or unsubstituted hydrocarbon group, $R^6$ is a monovalent group selected from the group consisting of alkyl groups and alkoxyalkyl groups, and c is a number of 0 or 1,
and (2) an anhydride of a polybasic acid.

The component (A) used in the present invention is a silanol-terminated polydiorganopolysiloxane customarily used for room temperature curable condensation type polysiloxane compositions of this type. In order to impart an appropriate extrudability to the composition before curing and to impart excellent mechanical properties to the rubbery elastomer formed by curing same, it is necessary that the viscosity of the component (A) should be in the range of 500 to 200,000 cSt measured at 25° C. If the viscosity is lower than 500 cSt, the elongation of the rubbery elastomer formed by curing is insufficient, and if the viscosity is higher than 200,000 cSt, a homogeneous composition is not readily obtained and the extrudability of the composition is degraded. In order to obtain a composition having good properties, both before and after curing, it is preferred that the viscosity of the component (A) is in the range of 3,000 to 150,000. As the organic groups bonded directly to the silicon atoms of the silanol-terminated polydiorganosiloxane, there can be mentioned, for example, alkyl groups such as methyl, ethyl, propyl, butyl and hexyl groups, alkenyl groups such as vinyl and allyl groups, aryl groups such as a phenyl group, aralkyl groups such as a styrenyl group, and monovalent substituted hydrocarbon groups such as 3,3,3-trifluoropropyl, chloromethyl and β-cyanoethyl groups. From the viewpoint of ease in the synthesis, a monovalent hydrocarbon group such as a methyl, vinyl or phenyl group is advantageously used. The use of other organic groups is recommended only when it is desired to impart special properties, such as oil resistance and paintability of the surface, to the rubbery elastomer formed by the curing. Among these organic groups, a methyl group is especially advantageous because the starting material can be obtained very easily, a relatively low viscosity can be obtained even if the degree of polymerization of the siloxane is relatively high and a good balance can be obtained between the extrudability of the composition before curing and the physical properties of the rubbery elastomer formed by curing. Accordingly, it is preferred that at least 85% of the organic groups be methyl groups, and it is especially preferred that substantially all of the organic groups be methyl groups. When it is necessary to impart cold resistance or heat resistance to the rubbery elastomer formed by curing, it is preferred that phenyl groups be incorporated as a part of the organic groups.

The component (B) that is used in the present invention is a component that reacts with the silanol groups of the component (A), in the presence of moisture, to form a rubbery elastomer. The component (B) is an acetoxy group-containing organic silicon compound selected from acetoxy group-contain ing silanes represented by the following general formula and partially hydrolyzed products thereof:

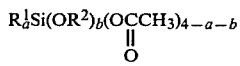

wherein $R^1$, $R^2$, a and b are as defined above.

This acetoxy group-containing organic silicon compound can be prepared by reacting a corresponding organochlorosilane with acetic anhydride and partially hydrolyzing or alkoxylating the reaction product. Further, it is known that this compound can be prepared by partially hydrolyzing or alkoxylating a corresponding organochlorosilane and reacting the partially hydrolyzed or alkoxylated product with an acetate, such as sodium acetate or potassium acetate. As the group $R^1$, there can be mentioned, for example, alkyl groups having 1 to 8 carbon atoms, such as methyl, ethyl, propyl, butyl, pentyl, hexyl and octyl groups, alkenyl groups having 2 or 3 carbon atoms, such as vinyl and allyl groups, aryl groups such as a phenyl group, aralkyl groups such as a styrenyl group, and monovalent substituted hydrocarbon groups such as 3,3,3-trifluoropropyl, chloromethyl and β-cyanoethyl groups. From the viewpoint of ease in the synthesis and handling, a methyl group is especially preferred. Alkyl and alkoxyalkyl groups are used as the group $R^2$. From the viewpoints of ease in handling and facility of the curing reaction, alkyl groups having 1 to 3 carbon atoms, such as methyl, ethyl and propyl groups and ethyl groups substituted with alkoxy groups having 1 or 2 carbon atoms, such as methoxyethyl and ethoxyethyl groups, are preferred as the group $R^2$. As specific examples of the component (B), there can be mentioned methyltriacetoxysilane, vinyltriacetoxysilane, methylmethoxydiacetoxysilane, methylethoxydiacetoxysilane, methyl-n-propoxydiacetoxysilane, methyl-i-propoxydiacetoxysilane, methyl(ethoxyethoxy)diacetoxysilane, partially hydrolyzed methyltriacetoxysilane and partially hydrolyzed vinyltriacetoxysilane. The component (B) is incorporated in the composition, according to the invention, in an amount of from 0.5 to 25 parts by weight, preferably 2 to 10 parts by weight, per 100 parts by weight of the component (A). When the amount added of component (B) is less than 0.5 part by weight, the curing speed of the composition is extremely high and partial gelation takes place at the compounding step, and the stability of the composition for long-time storage is lowered. When the amount added of component (B) is more than 25 parts by weight, separation or bleeding of the component (B) outside the composition takes place during storage, and the physical properties of the rubbery elastomer formed by curing are degraded.

The component (C) that is used in the present invention is prepared by reacting (1) an aminoalkyl group-containing organic silicon compound selected from the group consisting of aminoalkyl group-containing silanes represented by the following general formula and partially hydrolyzed products thereof:

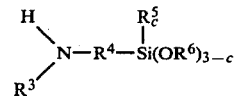

wherein $R^3$, $R^4$, $R^5$, $R^6$ and c are as defined above, with (2) an anhydride of a polybasic acid. In the aminoalkyl group-containing organic silicon compound (1), as the group $R^3$, there can be mentioned, for example, a hydrogen atom, an alkyl group having 1 to 8 carbon atoms, especially methyl, ethyl or propyl group, and a phenyl group. As the group $R^4$, there can be mentioned, for example, an alkylene group having 1 to 8 carbon atoms, especially methylene, ethylene, propylene, butylene or hexylene group, and a p-phenylene group. As the group $R^5$, there can be mentioned, for example, an alkyl group having 1 to 8 carbon atoms, especially methyl, ethyl or propyl group, an alkenyl group having 2 or 3 carbon atoms and a phenyl group. From the viewpoints of ease in the synthesis and the attainment of good adhesion, alkyl groups having 1 to 3 carbon atoms and ethyl groups substituted with alkoxy groups having 1 to 2 carbon atoms are preferred as the group $R^6$, and a methyl group is most preferred. The polybasic acid anhydride (2) is selected from available anhydrides of aliphatic, alicyclic and aromatic polybasic acids. As specific examples, there can be mentioned maleic anhydride, fumaric anhydride, succinic anhydride, adipic anhydride, phthalic anhydride, pyromellitic anhydride and trimellitic anhydride. The component (C) is synthesized by reacting stoichiometric amounts of the aminoalkyl group-containing organic silicon compound (1) with the polybasic acid anhydride (2), in the absence of a solvent or in the presence of an anhydrous inert solvent. As the solvent, there can be mentioned, for example, benzene, toluene, xylene, heptane, diethyl ether and tetrahydrofuran. The reaction product is usually refined by distillation under reduced pressure. The reaction progresses substantially quantitatively, and the resulting product can be used as the adhesion-improving agent directly as it is. The component (C) is incorporated in the composition, according to the invention, in an amount of 0.01 to 10 parts by weight, preferably 0.1 to 3 parts by weight, per 100 parts by weight of the component (A). When the amount added of component (C) is less than 0.01 part by weight, the effect of improving the self-adhesive property, i.e., adhesiveness without use of a primer, of the composition cannot be attained, and when the amount added is more than 10 parts by weight, the storage stability and extrudability of the composition are lowered and the physical properties of the rubbery elastomer formed by curing are adversely influenced.

In order to impart appropriate flowability and extrudability to the composition before curing and to impart good mechanical strength and hardness to the rubbery elastomer formed by curing, an inorganic filler is usually incorporated into the composition of the present invention comprising the components (A), (B) and (C). Known inorganic fillers, such as fumed silica, precipitated silica, silica aerogel, pulverized silica, diatomaceous earth, iron oxide, titanium dioxide and calcium carbonate, can be used. These inorganic fillers can be used singly or in the form of a mixture of two or more of them. Further, they can be used after their surfaces have been treated with organic silicon compounds such as polydimethylsiloxane, octamethylcyclotetrasiloxane and hexamethyldisilazane.

It is preferred that a catalyst for promoting the curing reaction is incorporated in the composition according to the present invention. As the catalyst, there can be mentioned, for example, quaternary ammonium salts such as tetramethylammonium acetate and trimethylhexylammonium chloride, organic acid salts of tin such as stannous octoate dibutyl tin diacetate, dibutyl tin dioctoate, dibutyl tin dilaurate, dioctyl tin maleate and diphenyl tin diacetate, and organic tin compounds such as dibutyl tin oxide. The amount added of the catalyst is not particularly critical. In the case of dibutyl tin dilaurate, for example, it is preferred that the catalyst is added in an amount of 0.05 to 1.0 part by weight per 100 parts by weight of the component (A).

Further, various additives such as pigments, thixotropic agents, extrudability-improving viscosity modifiers, ultraviolet inhibitors, mildew-proofing agents, heat resistance improving agents and flame retardants can optionally be incorporated in the composition of the present invention.

The composition of the present invention can be used as a so-called one-pack type room temperature curable polysiloxane composition. More specifically, all the critical components (A), (B) and (C), optionally containing an inorganic filler, a catalyst and/or other additives, are mixed in the state of being kept out with moisture, the resulting composition is stored in a sealed vessel and at the time of actual application, the composition is cured by exposure to the moisture present in the ambient air. Further, the composition of the present invention can also be used in the form of a so-called two-pack type room temperature curable polysiloxane composition. More specifically, the components (A), (B), (C) and optionally added catalyst, are stored seperately in two vessels, and they are mixed when the composition is actually used.

According to the present invention, there is obtained a deacetylation-type room temperature curable polysiloxane composition having an improved self-adhesive property (as defined above) and an improved bonding durability. Even without use of a primer, the composition of the present invention adheres very tightly in a good condition to glass, porcelain materials, aluminum, various metals, plastics and other various materials. Accordingly, the composition of the present invention is advantageous compared to the conventional compositions in the point that the application fields of the composition are not limited. Therefore, the composition of the present invention can be effectively used widely as a sealing material for construction and other purposes.

The present invention will now be further described in detail by reference to the following illustrative Examples, in which all references to "parts" mean parts by weight. In these Examples, there were used the base compounds A to E formed in advance by mixing and uniformly kneading the components shown below.

| Base Compound | Components | Parts by Weight |
|---|---|---|
| A | silanol-terminated polydimethylsiloxane (20,000 cSt at 25° C.) | 100 |
|  | polydimethylsiloxane-treated fumed silica (surface area = 200 m²/g) | 12 |
| B | silanol-terminated polydimethylsiloxane (80,000 cSt at 25° C. | 70 |
|  | trimethylsiloxy-terminated polydimethylsiloxane (100 cSt at 25° C.) | 30 |
|  | polydimethylsiloxane-treated fumed silica (surface area = 200 m²/g) | 12 |
| C | silanol-terminated polydimethylsiloxane (20,000 cSt at 25° C.) | 80 |
|  | trimethylsiloxy-terminated polydimethylsiloxane (100 cSt at 25° C.) | 20 |
|  | fumed silica (surface area = 200 m²/g) | 10 |
| D | silanol-terminated polydimethylsiloxane (3,000 cSt at 25° C.) | 100 |
| D | polydimethylsiloxane-treated fumed silica (surface area = 200 m²/g) | 8 |
|  | diatomaceous earth | 80 |
| E | silanol-terminated polydimethylsiloxane (40,000 cSt at 25° C.) | 70 |
|  | trimethylsiloxy-terminated polydimethylsiloxane (100 cSt at 25° C.) | 30 |
|  | hexamethyldisilazane-treated fumed silica (surface area = 300 m²/g | 12 |

EXAMPLE 1

A three-neck flask having a capacity of 1 liter was charged with 148 g (1 mole) of phthalic anhydride and 300 ml of toluene, and then 221 g (1 mole) of γ-aminopropyltriethoxysilane was added dropwise at room temperature under agitation. Reaction was conducted for 3 hours, and toluene was removed under reduced pressure to obtain a reaction product (I).

A curing agent mixture was prepared by homogeneously mixing 0.5 part of the thus-obtained reaction product (I), 5 parts of partially hydrolyzed methyltriacetoxysilane and 0.02 part of dibutyl tin diacetate. This curing agent mixture was kneaded uniformly with 112 parts of the preformed base compound A in dry air to form a polysiloxane composition. The composition was coated on the substrate, as indicated in Table 1, and was then cured for 7 days at a temperature of 25° C. and at a relative humidity of 60%. Then, the bonded material was immersed in warm water maintained at 50° C. for 2 days, and the peel adhesive force and cohesive failure ratio were determined. The results obtained are shown in Table 1.

Comparative Examples 1 to 3

The procedure of Example 1 was repeated in the same manner except that the reaction product (I) was not used (Comparative Example 1), 0.3 part of γ-aminopropyltriethoxysilane was used instead of the reaction product (I) (Comparative Example 2), or 0.2 part of phthalic anhydride was used instead of the reaction product (I) (Comparative Example 3). The adhesion test was carried out in the same manner as described in Example 1. The results obtained are shown in Table 1.

Table 1

|  | Example 1 | | Comparative Example 1 | | Comparative Example 2 | | Comparative Example 3 | |
|---|---|---|---|---|---|---|---|---|
| Sabstrate | Peel Adhesive Strength (Kg/3cm) | Cohesive Failure Ratio (%) | Peel Adhesive Strength (Kg/3cm) | Cohesive Failure Ratio (%) | Peel Adhesive Strength (Kg/3cm) | Cohesive Failure Ratio (%) | Peel Adhesive Strength (Kg/3cm) | Cohesive Failure Ratio (%) |
| aluminum | 7.1 | 100 | <1 | 0 | <1 | 0 | 4.2 | 50 |
| stainless steel | 5.8 | 80 | <1 | 0 | <1 | 0 | <1 | 0 |
| copper | 6.2 | 100 | 6.2 | 100 | <1 | 0 | <1 | 0 |
| brass | 6.3 | 100 | <1 | 0 | <1 | 0 | <1 | 0 |
| zinc plate | 6.8 | 100 | 3.8 | 50 | <1 | 0 | <1 | 0 |
| tin plate | 5.9 | 80 | <1 | 0 | <1 | 0 | <1 | 0 |
| soft steel | 6.8 | 100 | <1 | 0 | <1 | 0 | <1 | 0 |
| glass | 7.0 | 100 | 6.7 | 100 | 5.3 | 50 | 7.1 | 100 |

EXAMPLE 2

A three-neck flask having a capacity of 1 liter was charged with 100 g (1 mole) of succinic anhydride and 500 ml of tetrahydrofuran, and then 221 g (1 mole) of γ-aminopropyltriethoxysilane was added dropwise at room temperature under agitation. Reaction was conducted for 4 hours, and tetrahydrofuran was removed by distillation under reduced pressure to obtain a reaction product (II).

A curing agent mixture was prepared by homogeneously mixing 0.3 part of the thus-obtained reaction product (II), 3 parts of methyl(ethoxyethoxy)diacetoxysilane and 0.02 part of dioctyl tin dilaurate. The thus-obtained curing agent mixture was uniformly kneaded with 112 parts of the preformed base compound B in dry air to obtain a polysiloxane composition. The adhesion test was carried out in the same manner as described in Example 1. The results obtained are shown in Table 2.

Comparative Examples 4 to 6

The procedure of Example 2 was repeated in the same manner except that the reaction product (II) was not used (Comparative Example 4), 0.2 part of γ-aminopropyltriethoxysilane was added instead of the reaction product (II) (Comparative Example 5), or 0.1 part of succinic anhydride was added instead of the reaction product (II) (Comparative Example 6). The adhesion test was carried out in the same manner as in Example 1. The results obtained are shown in Table 2.

EXAMPLE 3

A three-neck flask having a capacity of 1 liter was charged with 128 g (1 mole) of adipic anhydride and 500 ml of toluene, and then 255 g (1 mole) of N-phenylaminopropyltrimethoxysilane was added dropwise at room temperature under agitation. Reaction was conducted at 80° C. for 4 hours, and toluene was removed by distillation under reduced pressure to obtain a reaction product (III).

A curing agent mixture was prepared by homogeneously mixing 0.3 part of the thus-obtained reaction product (III), 4 parts of methylethoxydiacetoxysilane and 0.02 part of dioctyl tin diacetate. The thus-obtained curing agent mixture was uniformly kneaded with 110 parts of the preformed base compound C in dry air to obtain a polysiloxane composition. The adhesion test was carried out in the same manner as in Example 1. The results obtained are shown in Table 3.

Comparative Examples 7 to 9

The procedure of Example 3 was repeated in the same manner except that the reaction product (III) was not used (Comparative Example 7), 0.25 part of N-phenylaminopropyltrimethoxysilane was added instead of the reaction product (III) (Comparative Example 8), or 0.1 part of adipic anhydride was added instead of the reaction product (III) (Comparative Example 9). The adhesion test was carried out in the same manner as in Example 1. The results obtained are shown in Table 3.

Table 2

|  | Example 2 | | Comparative Example 4 | | Comparative Example 5 | | Comparative Example 6 | |
|---|---|---|---|---|---|---|---|---|
| Substrate | Peel Adhesive Strength (Kg/3cm) | Cohesive Failure Ratio (%) | Peel Adhesive Strength (Kg/3cm) | Cohesive Failure Ratio (%) | Peel Adhesive Strength (Kg/3cm) | Cohesive Failure Ratio (%) | Peel Adhesive Strength (Kg/3cm) | Cohesive Failure Ratio (%) |
| aluminum | 9.8 | 100 | <1 | 0 | <1 | 0 | <1 | 0 |
| copper | 10.6 | 100 | <1 | 0 | <1 | 0 | <1 | 0 |
| brass | 13.2 | 100 | <1 | 0 | <1 | 0 | <1 | 0 |
| zinc plate | 9.6 | 100 | <1 | 0 | <1 | 0 | <1 | 0 |
| tin plate | 8.2 | 50 | <1 | 0 | <1 | 0 | <1 | 0 |
| soft steel | 9.1 | 100 | <1 | 0 | <1 | 0 | <1 | 0 |
| glass | 9.3 | 100 | 6.2 | 50 | <1 | 0 | 9.0 | 100 |

Table 3

| Substrate | Example 3 Peel Adhesive Strength (Kg/3cm) | Example 3 Cohesive Failure Ratio (%) | Comparative Example 7 Peel Adhesive Strength (Kg/3cm) | Comparative Example 7 Cohesive Failure Ratio (%) | Comparative Example 8 Peel Adhesive Strength (Kg/3cm) | Comparative Example 8 Cohesive Failure Ratio (%) | Comparative Example 9 Peel Adhesive Strength (Kg/3cm) | Comparative Example 9 Cohesive Failure Ratio (%) |
|---|---|---|---|---|---|---|---|---|
| aluminum | 6.6 | 100 | 3.5 | 50 | <1 | 0 | 3.8 | 50 |
| stainless steel | 4.3 | 50 | <1 | 0 | <1 | 0 | <1 | 0 |
| copper | 5.8 | 100 | <1 | 0 | <1 | 0 | <1 | 0 |
| brass | 5.9 | 100 | <1 | 0 | <1 | 0 | <1 | 0 |
| zinc plate | 6.2 | 100 | <1 | 0 | <1 | 0 | 4.2 | 50 |
| tin plate | 3.7 | 50 | <1 | 0 | <1 | 0 | <1 | 0 |
| soft steel | 7.0 | 100 | <1 | 0 | <1 | 0 | <1 | 0 |
| acrylic resin | 4.1 | 50 | <1 | 0 | <1 | 0 | <1 | 0 |
| rigid vinyl chloride resin | 7.0 | 100 | <1 | 0 | <1 | 0 | 3.4 | 50 |
| phenolic resin | 6.3 | 100 | <1 | 0 | <1 | 0 | <1 | 0 |

EXAMPLE 4

A three-neck flask having a capacity of 1 liter was charged with 110 g (1 mole) of pyromellitic anhydride and 500 ml of tetrahydrofuran, and then 221 g (1 mole) of γ-aminopropyltriethoxysilane was added dropwise at room temperature under agitation. Reaction was conducted at 100° C. for 6 hours, and tetrahydrofuran was removed by distillation under reduced pressure to obtain a reaction product (IV).

A curing agent mixture was prepared by homogeneously mixing 0.8 part of the thus-obtained reaction product (IV), 4 parts of vinylmethoxydiacetoxysilane and 0.04 part of dioctyl tin dilaurate. The thus-obtained curing agent mixture was uniformly kneaded with 188 parts of the preformed base compound D in dry air to obtain a polysiloxane composition. The adhesion test was carried out in the same manner as in Example 1. The results obtained are shown in Table 4.

Comparative Examples 10 to 12

The procedure of Example 4 was repeated in the same manner except that the reaction product (IV) was not used (Comparative Example 10), 0.5 part of γ-aminopropyltriethoxysilane was added instead of the reaction product (IV) (Comparative Example 11), or 0.3 part of pyromellitic anhydride was added instead of the reaction product (IV) (Comparative Example 12). The adhesion test was carried out in the same manner as in Example 1. The results obtained are shown in Table 4.

Table 4

| Substrate | Example 4 Peel Adhesive Strength (Kg/3cm) | Example 4 Cohesive Failure Ratio (%) | Comparative Example 10 Peel Adhesive Strength (Kg/3cm) | Comparative Example 10 Cohesive Failure Ratio (%) | Comparative Example 11 Peel Adhesive Strength (Kg/3cm) | Comparative Example 11 Cohesive Failure Ratio (%) | Comparative Example 12 Peel Adhesive Strength (Kg/3cm) | Comparative Example 12 Cohesive Failure Ratio (%) |
|---|---|---|---|---|---|---|---|---|
| aluminum | 5.3 | 100 | 3.1 | 50 | <1 | 0 | 3.3 | 50 |
| soft steel | 4.9 | 100 | 3.0 | 50 | <1 | 0 | 3.0 | 50 |
| acrylic resin | 6.2 | 50 | <1 | 0 | <1 | 0 | <1 | 0 |
| rigid vinyl chloride resin | 6.4 | 100 | <1 | 0 | <1 | 0 | <1 | 0 |
| phenolic resin | 5.8 | 100 | 2.4 | 50 | <1 | 0 | <1 | 0 |
| melamine resin | 6.0 | 100 | <1 | 0 | <1 | 0 | <1 | 0 |
| ABS resin | 5.7 | 100 | <1 | 0 | <1 | 0 | <1 | 0 |

EXAMPLE 5

A three-neck flask having a capacity of 1 liter was charged with 128 g (1 mole) of adipic anhydride and 500 ml of toluene, and then 235 g (1 mole) of N-n-butylaminopropyltrimethoxysilane was added dropwise at room temperature under agitation. Reaction was conducted at 70° C. for 5 hours, and toluene was removed by distillation under reduced pressure to obtain a reaction product (V).

A curing agent mixture was prepared by homogeneously mixing 0.4 part of the thus-obtained reaction product (V), 4 parts of methyltriacetoxysilane, 1 part of dibutoxydiacetoxysilane and 0.04 part of dioctyl tin maleate. The thus-obtained curing agent mixture was uniformly kneaded with 112 parts of the preformed base compound E in dry air to obtain a polysiloxane composition.

The composition was coated on a substrate as indicated in Table 5, and was then 7 days at a temperature of 25° C. and a relative humidity of 60%. Then, the bonded material was immersed in warm water maintained at 50° C. for 2 days. The peel adhesive strength and cohesive failure ratio were determined in the normal state and after immersion in warm water. The results obtained are shown in Table 5.

Comparative Examples 13 to 15

The procedure of Example 5 was repeated in the same manner except that instead of the reaction product (V), equal amounts of methyltriacetoxysilane and dibutoxydiacetoxysilane were used (Comparative Example 13), 0.25 part of N-n-butylaminopropyltrimethoxysilane was used (Comparative Example 14), or 0.15 part of adipic anhydride was used (Comparative Example 15). The adhesion test was carried out in the same manner as in Example 5. The results obtained are shown in Table 5.

EXAMPLE 8

A polysiloxane composition was prepared in the same manner as described in Example 1 except that a mixture of 3 parts of methyltriacetoxysilane and 2 parts of dibutoxydiacetoxysilane was used, instead of partially hydrolyzed methyltriacetoxysilane. By using this composition, the adhesion test was carried out in the same manner as described in Example 1. It was found that the composition showed a good adhesiveness to all the Table 5

| | Example 5 | | | | Comparative Example 13 | | | |
|---|---|---|---|---|---|---|---|---|
| | Normal State | | After Water Immersion | | Normal State | | After Water Immersion | |
| Substrate | Peel Adhesive Strength (Kg/3cm) | Cohesive Failure Ratio (%) | Peel Adhesive Strength (Kg/3cm) | Cohesive Failure Ratio (%) | Peel Adhesive Strength (Kg/3cm) | Cohesive Failure Ratio (%) | Peel Adhesive Strength (Kg/3cm) | Cohesive Failure Ratio (%) |
| aluminum | 10.2 | 100 | 9.1 | 100 | 10.1 | 100 | 5.7 | 50 |
| stainless steel | 9.8 | 100 | 6.3 | 50 | 4.3 | 50 | <1 | 0 |
| zinc plate | 9.2 | 100 | 8.8 | 100 | 7.8 | 100 | <1 | 0 |
| acrylic resin | 4.3 | 50 | <1 | 0 | 6.1 | 50 | <1 | 0 |
| rigid vinyl chloride resin | 8.7 | 100 | 8.2 | 100 | 9.0 | 100 | <1 | 0 |
| polyester | 9.0 | 100 | 9.4 | 100 | 8.7 | 100 | <1 | 0 |
| polyamide | 8.9 | 100 | 8.3 | 100 | 8.3 | 100 | 3.8 | 50 |
| glass | 9.1 | 100 | 8.7 | 100 | 8.9 | 100 | 7.8 | 100 |

| | Comparative Example 14 | | | | Comparative Example 15 | | | |
|---|---|---|---|---|---|---|---|---|
| | Normal State | | After Water Immersion | | Normal State | | After Water Immersion | |
| Substrate | Peel Adhesive Strength (Kg/3cm) | Cohesive Failure Ratio (%) | Peel Adhesive Strength (Kg/3cm) | Cohesive Failure Ratio (%) | Peel Adhesive Strength (Kg/3cm) | Cohesive Failure Ratio (%) | Peel Adhesive Strength (Kg/3cm) | Cohesive Failure Ratio (%) |
| aluminum | 4.6 | 50 | <1 | 0 | 8.2 | 100 | 3.7 | 50 |
| stainless steel | <1 | 0 | <1 | 0 | 4.6 | 50 | <1 | 0 |
| zinc plate | <1 | 0 | <1 | 0 | 7.3 | 100 | 4.1 | 50 |
| acrylic resin | <1 | 0 | <1 | 0 | <1 | 0 | <1 | 0 |
| rigid vinyl chloride resin | <1 | 0 | <1 | 0 | 5.3 | 50 | <1 | 0 |
| polyester | <1 | 0 | <1 | 0 | 5.7 | 50 | <1 | 0 |
| polyamide | <1 | 0 | <1 | 0 | 6.3 | 50 | <1 | 0 |
| glass | 2.9 | 50 | <1 | 0 | 10.4 | 100 | 10.1 | 100 |

EXAMPLE 6

The procedure of Example 1 was repeated in the same manner except that in the base compound A, there was used a silanol-terminated polydiorganosiloxane (having a viscosity of 30,000 cSt as measured at 25° C.) comprised of 5 mole % of diphenylsiloxane units and 95 mole % of dimethylsiloxane units, instead of the silanol-terminated polydimethylsiloxane. Using the resulting polysiloxane composition, the adhesion test was carried out in the same manner as in Example 1. It was found that the composition showed a good adhesiveness to all the materials.

EXAMPLE 7

A polysiloxane composition was prepared in the same manner as described in Example 1, except that 5 parts of vinyltriacetoxysilane was used instead of partially hydrolyzed methyltriacetoxysilane. By using this composition, the adhesion test was carried out in the same manner as described in Example 1. It was found that the composition showed a good adhesiveness to all the materials.

EXAMPLE 9

A polysiloxane composition was prepared in the same manner as described in Example 1, except that 444 g (2 moles) of N-(aminoethyl)-γ-aminopropyltrimethoxysilane was used instead of γ-aminopropyltriethoxysilane. By using this polysiloxane composition, the adhesion test was carried out in the same manner as described in Example 1. It was found that the composition showed a good adhesiveness to all the materials.

The embodiments of the invention in which an exclusive property or privilege is claimed are defined as follows:

1. A room temperature curable polyorganosiloxane composition consisting essentially of (A) 100 parts by weight of a silanol-terminated polydiorganosiloxane having a viscosity of 500 to 200,000 cSt measured at 25° C., (B) 0.5 to 25 parts by weight of an acetoxy group-containing organic silicon compound selected from the group consisting of acetoxy group-containing silanes having the following formula and partially hydrolyzed products thereof:

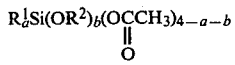

wherein $R^1$ is a monovalent substituted or unsubstituted hydrocarbon group, $R^2$ is a monovalent group selected from the group consisting of alkyl groups and alkoxyalkyl groups, a is a number of 0 or 1, and b is a number of 0 or 1, and (C) 0.01 to 10 parts by weight of the reaction product of the reaction between (1) an aminoalkyl group-containing organic silicon compound selected from the group consisting of aminoalkyl group-containing silanes having the following formula and partially hydrolyzed products thereof:

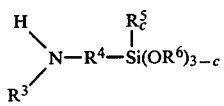

wherein $R^3$ is hydrogen or a monovalent substituted or unsubstituted hydrocarbon group, $R^4$ is a divalent hydrocarbon group, $R^5$ is a monovalent substituted or unsubstituted hydrocarbon group, $R^6$ is a monovalent group selected from the group consisting of alkyl groups and alkoxyalkyl groups, and c is a number of 0 or 1, and (2) an anhydride of a polycarboxylic acid.

2. A composition as set forth in claim 1, which further contains an effective amount of an inorganic filler for a room temperature curable polyorganosiloxane composition.

3. A composition as set forth in claim 1, which further contains an effective curing amount of a catalyst selected from the group consisting of quaternary ammonium salts and organic tin compounds.

4. A composition as set forth in claim 1 wherein the organic group of the silanol-terminated polydiorganosiloxane (A) is the same or different monovalent group selected from the group consisting of monovalent hydrocarbon groups and monovalent halogenated hydrocarbon groups.

5. A composition as set forth in claim 4 wherein the organic group of the silanol-terminated polydiorganosiloxane (A) is a monovalent hydrocarbon group selected from the group consisting of methyl, vinyl and phenyl.

6. A composition as set forth in claim 5 wherein the organic group of the silanol-terminated polydiorganosiloxane (A) is methyl.

7. A composition as set forth in claim 1 wherein the group $R^1$ of the component (B) is a monovalent group selected from the group consisting of alkyl having 1 to 8 carbon atoms, alkenyl group having 2 or 3 carbon atoms and phenyl.

8. A composition as set forth in claim 7 wherein the group $R^1$ of the component (B) is methyl.

9. A composition as set forth in claim 1 wherein the group $R^2$ of the component (B) is a monovalent group selected from the group consisting of alkyl having 1 to 3 carbon atoms and ethyl substituted with an alkoxy having 1 or 2 carbon atoms.

10. A composition as set forth in claim 1 wherein the group $R^3$ of the component (C) is a monovalent group selected from the group consisting of hydrogen atom, alkyl having 1 to 8 carbon atoms and phenyl.

11. A composition as set forth in claim 1 wherein the group $R^4$ of the component (C) is alkylene having 1 to 8 carbon atoms.

12. A composition as set forth in claim 1 wherein the group $R^5$ of the component (C) is a monovalent group selected from the group consisting of alkyl having 1 to 8 carbon atoms, alkenyl having 2 or 3 carbon atoms and phenyl.

13. A composition as set forth in claim 12 wherein the group $R^5$ of the component (C) is methyl.

14. A composition as set forth in claim 1 wherein the group $R^6$ is a monovalent group selected from the group consisting of alkyl having 1 to 3 carbon atoms and ethyl substituted with alkoxy having 1 or 2 carbon atoms.

15. A composition according to claim 1 containing from 2 to 10 parts by weight of component B and from 0.1 to 3 parts by weight of component C, per 100 parts by weight of component A.

16. A composition according to claim 1 in which said polycarboxylic acid anhydride is selected from the group consisting of maleic anhydride, fumaric anhydride, succinic anhydride, adipic anhydride, phthalic anhydride, pyromellitic anhydride and trimellitic anhydride.

17. A composition according to claim 1 in which the molar ratio of component (1) to component (2) is substantially 1:1.